Oct. 6, 1953 — A. WASBERG — 2,654,450
RAILWAY HOUSE CAR STRUCTURE
Filed Feb. 19, 1951

Inventor
Axel Wasberg
By Rodney Bedell
Atty.

Patented Oct. 6, 1953

2,654,450

UNITED STATES PATENT OFFICE 2,654,450

RAILWAY HOUSE CAR STRUCTURE

Axel Wasberg, Chicago, Ill., assignor to Chicago Railway Equipment Company, Chicago, Ill., a corporation of Illinois Application February 19, 1951, Serial No. 211,770

6 Claims. (Cl. 189—46)

The invention relates to railway rolling stock and more particularly to house car side door and associated structure and the invention consists in the novel arrangement of parts rigidifying the lower portion of the door, and adapting the door for being mounted upon an anti-friction bearing and the advantageous relation of this part of the door to the adjacent threshold and anti-friction bearing track of the door body.

The main object of the invention is to adapt the door and its mounting for heavy service demands arising from the growing increase in door openings, the use of lift trucks of the type which include a fork adjacent the surface over which the truck operates. These conditions require a stiffening or rigidifying of the lower portion of the door which create problems in the application of additional metal due to the restricted space, both vertically and transversely of the car floor, within which the car door and associated parts must be placed.

The above-mentioned object and other detail objects are attained by the structure illustrated in the accompanying drawings, in which.

Figure 1:
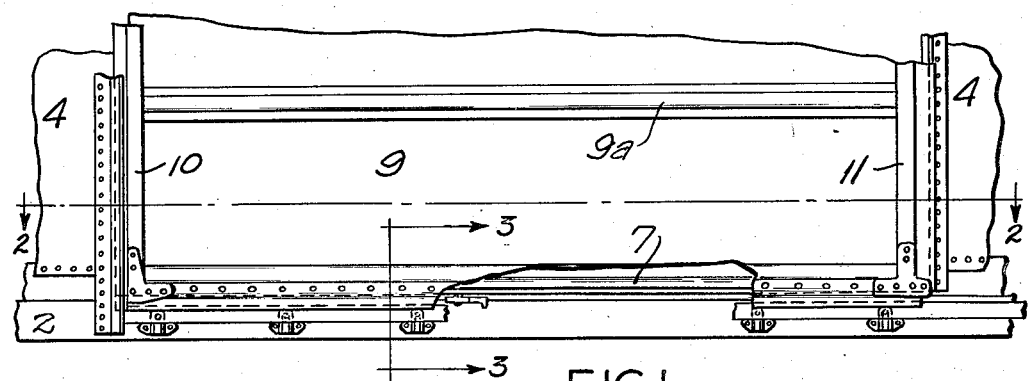
Figure 1 is a side view of a portion of the side of a car adjacent the door opening with a door shown in closed position. A portion of the door is broken away to show the threshold structure behind the door.
Figure 2:
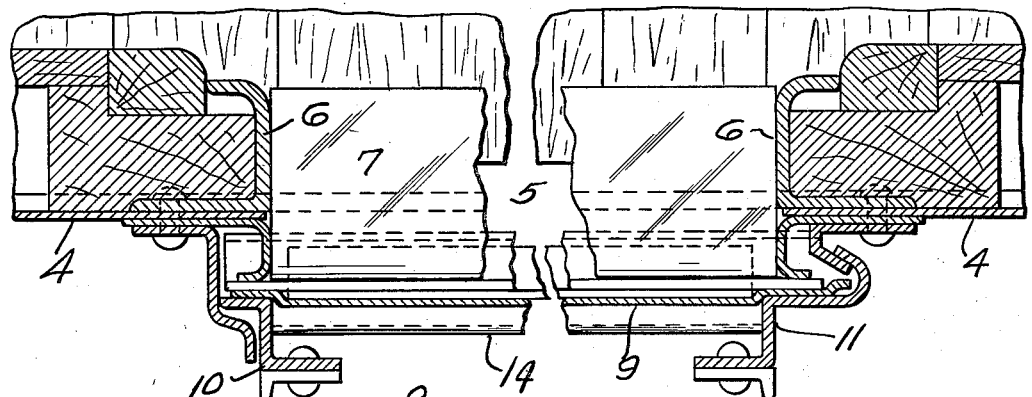
Figure 2 is a horizontal section taken on the line 2—2 of Figure 1, with the intermediate portion of the door and car omitted to permit the showing on an enlarged scale.
Figure 3:
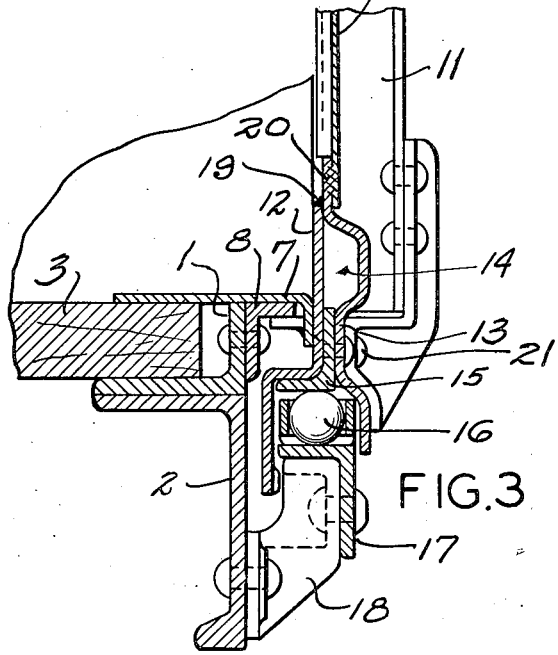
Figure 3 is a vertical transverse section taken on the line 3—3 of Figure 1.

The car body includes a side sill 1 and a reinforcing angle 2 of rolled steel sections, a floor 3, side walls 4, each having a door opening 5 defined by door posts 6, a threshold 7 and a top plate (not shown). Preferably, the threshold is reinforced by an angle 8 secured to sill element 1. The door is formed of metal panels 9 with front and rear edge members 10 and 11, respectively. The panels may be corrugated or otherwise reinforced, as indicated at 9a, between the top and bottom of the door.

The lowermost portion of the door comprises an inner plate 12 and an outer plate 13, secured to the lower margin of the lowermost body panel 9 above the level of the threshold and extending downwardly from the door body panel and being offset relative to each other transversely of the door for a short distance to form a box section 14, the lower portion of which preferably includes an angle iron bottom rail 15 which rides upon an anti-friction bearing 16 mounted on a track 17 supported by brackets 18 from reinforcement 2.

Plates 12 and 13 are connected to each other and to the other door parts at 19, 20 and 21 by welds or rivets or both, these connections being spaced apart vertically, one above and the other below the level of the threshold. The lower portions of plates 12 and 13 extend downwardly below rail 15 and are there offset from each other transversely of the door to form a housing for anti-friction bearings 16 and track 17.

Preferably the upright flange of door rail angle 15 extends alongside the downturned flange of threshold 7 and the horizontal flange of angle 15 extends inwardly of the car beneath the outer portion of threshold 7. Bearing 16 and track 17 also extend inwardly of the outer face of threshold 7.

With the above arrangement, the box section framing of the lower marginal portion of the door and the bottom rail and bearing-track housing are combined to form a compact structure, adequate in strength and so positioned as to satisfactorily meet the conditions under which they must operate without reducing the inside width or increasing the over-all width of the car and the door may be increased in length from the front edge and rear edge substantially beyond the maximum practical width of previously known structure. The lower portion of the door is well adapted to resist bulging by bulk lading and is not likely to be distorted when struck by lift trucks which may be carelessly handled adjacent the door.

The details shown and described may be varied without departing from the spirit of the invention and the exclusive use of those modifications coming within the scope of the claims is contemplated.

What is claimed is:

1. In a railway house car, a body including a floor and a side wall having a relatively wide door opening, a threshold plate mounted on the floor at the bottom of said opening, a wide door for closure of said opening comprising a metal panel having its lower longitudinal margin terminating upwardly and outwardly of said threshold plate, a first plate section secured adjacent its upper margin to the inner face of said panel for extension downwardly from said panel throughout the length of said panel, a second plate section secured at its upper end to the inwardly presented face of said first plate section and extending downwardly between same and the threshold plate, said first plate section projecting outwardly and downwardly immediately beneath the lower margin of said panel, then vertically downwardly in spaced, parallel relation to said second plate section to a point substantially aligned with the upper surface of said threshold plate, and thence downwardly and inwardly toward said second plate section to define a box section extending the length of the door and immediately above, and outwardly of, said threshold plate for reinforcement purposes, said first and second plate sections being oppositely offset in their lower portions, downwardly and partially beneath said threshold plate for defining an open-bottomed housing, and door sliding means received within said housing.

2. In a railway house car, a body including a floor and a side wall having a relatively wide door opening, a threshold plate mounted on the floor at the bottom of said opening, a wide door for closure of said opening comprising a metal panel having its lower longitudinal margin terminating upwardly and outwardly of said threshold plate, a first plate section secured adjacent its upper margin to the inner face of said panel for extension downwardly therefrom throughout the length of said panel, a second plate section secured at its upper end to the inwardly presented face of said first plate section and extending downwardly between same and the threshold plate, said first plate section projecting outwardly and downwardly immediately beneath the lower margin of said panel, then vertically downwardly in spaced, parallel relation to said second plate section to a point substantially aligned with the upper surface of said threshold plate, and thence downwardly and inwardly toward said second plate section to define a box section extending the length of the door and immediately above, and outwardly of, said threshold plate for reinforcement purposes, said first plate section being outwardly offset in its lower portion, downwardly of said threshold plate, said second plate section being inwardly offset in its lower portion to form a horizontal portion downwardly of the threshold plate and extending therebeneath, said second plate section having a vertical lower terminal portion to cooperate with the lower outwardly offset portion of the first plate section to define an open-bottomed housing, and door-sliding means received within said housing.

3. In a railway house car, a body including a floor and a side wall having a relatively wide door opening, a threshold plate mounted on the floor at the bottom of said opening, a wide door for closure of said opening comprising a metal panel having its lower longitudinal margin terminating upwardly and outwardly of said threshold plate, a first plate section secured adjacent its upper margin to the inner face of said panel for extension downwardly therefrom throughout the length of said panel, a second plate section secured at its upper end to the inwardly presented face of said first plate section and extending downwardly between same and the threshold plate, said first plate section projecting outwardly and downwardly immediately beneath the lower margin of said panel, then vertically downwardly in spaced, parallel relation to said second plate section to a point substantially aligned with the upper surface of said threshold plate, and thence downwardly and inwardly toward said second plate section to define a box section extending the length of the door and immediately above, and outwardly of the threshold plate for reinforcement purposes, said first and second plate sections being oppositely offset in their lower portions, downwardly of, and partially beneath, said threshold plate for defining an open-bottomed housing, an angular rail section having its upright flange secured to, and between, said first and second plate sections, the upper end of said upright flange terminating beneath the upper surface of the threshold plate, the horizontal flange of said angular rail section being disposed transversely within said open-bottomed housing, and door-sliding means received within said housing.

4. A door for railway house cars comprising a rigid, wide panel, a first plate section secured adjacent its upper margin to the normally inward face of said panel for extension downwardly below the bottom margin thereof throughout the length of said panel, a second plate section secured at its upper end to the normally inwardly presented face of said first plate section for extension downwardly below said panel, said first plate section projecting outwardly and downwardly immediately beneath the lower margin of said panel, then vertically downwardly in spaced, parallel relation to said second plate section, and thence downwardly and inwardly toward said second plate section to define a box section extending the length of the door, said first and second plate sections being oppositely offset in their lower portions, downwardly of said box section for defining an open-bottomed housing.

5. A door for railway house cars comprising a rigid, wide panel, a first plate section secured adjacent its upper margin to the normally inward face of said panel for extension downwardly below the bottom margin thereof throughout the length of said panel, a second plate section secured at its upper end to the normally inwardly presented face of said first plate section for extension downwardly below said panel, said first plate section projecting outwardly and downwardly immediately beneath the lower margin of said panel, then vertically downwardly in spaced, parallel relation to said second plate section, and thence downwardly and inwardly toward said second plate section to define a box section extending the full length of the door, said first plate section being outwardly offset in its lower portion, downwardly of the box section, said second plate section being inwardly offset in its lower portion, downwardly of said box section, to form a horizontal portion, said second plate section further having a vertically lower terminal portion to cooperate with the lower outwardly offset portion of the first plate section to define an open-bottomed housing.

6. A door for railway house cars comprising a rigid, wide panel, a first plate section secured adjacent its upper margin to the normally inward face of said panel for extension downwardly below the bottom margin thereof throughout the length of said panel, a second plate section secured at its upper end to the normally inwardly presented face of said first plate section for extension downwardly below said panel, said first plate section projecting outwardly and downwardly immediately beneath the lower margin of said panel, then vertically downwardly in spaced, parallel relation to said second plate section, and thence downwardly and inwardly toward said second plate section to define a box section extending the length of the door, for reinforcement purposes, said first and second plate sections being oppositely offset in their lower portions, downwardly of said box section, for defining an open-bottomed housing, and an angular rail section having its normally upright flange secured to, and between, said first and second plate sections, the upper end of said upright flange terminating beneath the box section, the horizontal flange of said angular rail section being disposed transversely within said open-bottomed housing.

AXEL WASBERG.

References Cited in the file of this patent

UNITED STATES PATENTS

| Number | Name | Date |
| --- | --- | --- |
| 1,817,347 | Campbell et al. | Aug. 4, 1931 |
| 1,830,388 | Dorsey | Nov. 3, 1931 |
| 1,916,559 | Campbell | July 4, 1933 |
| 2,038,052 | Madland | Apr. 21, 1936 |
| 2,226,681 | Willoughby | Dec. 31, 1940 |
| 2,245,812 | Osner et al. | June 17, 1941 |
| 2,313,106 | Wasberg | Mar. 9, 1943 |
| 2,397,335 | Christiansen | Mar. 26, 1946 |